Patented Feb. 14, 1939

2,146,873

UNITED STATES PATENT OFFICE 2,146,873

PLASTIC MASSES FROM ORGANIC COLLOIDS

Gustav Wilmanns, Wolfen Kreis Bitterfeld, Germany, assignor to I. G. Farbenindustrie Aktiengesellschaft, Frankfort-on-the-Main, Germany No Drawing. Application July 15, 1936, Serial No. 90,789. In Germany July 17, 1935

14 Claims. (Cl. 106—38)

My present invention relates to the manufacture of plastic masses and more particularly to the manufacture of plastic masses from hydrophil colloids.

One of its objects is a process of producing an improved plastic mass of a hydrophil organic colloid. Other objects are the plastic masses obtained by the aforesaid process. Further objects will be seen from the detailed specification following hereafter.

Plastic masses produced from hydrophil organic colloids, for example albumens such as gelatin or glue, cellulose and its derivatives, such as methylcellulose, poly-saccharides such as starch or agar-agar, or polymerizates such as vinyl alcohol, have the disadvantage that their elasticity and strength depend largely on their water content, which depends on the relative humidity of the atmosphere wherein they happen to be. Thus for example leaves or tinsel of gelatin or sheets of glue have a good elasticity and flexibility at a relative atmospheric humidity of 65–85 per cent, but become brittle and, for many purposes, useless at a relative atmospheric humidity of 30–40 per cent. Foils of methylcellulose or agar-agar behave in a similar way.

Various substances have been added to the colloids in an attempt to eliminate this defect, however, their effect is due to their relatively high affinity for water, and it therefore depends on the relative humidity of the atmosphere. If a large proportion of such a softening agent is added, it is true that brittleness of the plastic body is avoided, but at medium and high relative humidities the body easily becomes sticky.

The present invention is based on the observation that aliphatic amino compounds with an unbranched carbon chain of at least six carbon atoms are very good softening agents for hydrophil organic colloids on account of their chemical constitution. The products made from plastic masses of a hydrophil colloid prepared with the aid of the new softening agents have improved mechanical properties particularly at a low degree of moisture. Suitable amino compounds are, for instance, such which correspond with the general formulae (1) 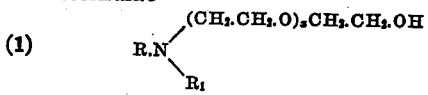

(2) R.N.Z.(CH$_2$)$_x$.CO.Y with an unbranched or a branched chain (3) 

$x$ stands for 1 and a number $> 1$
Y stands for instance for OH, ONa, OCH$_3$, NH$_2$ and

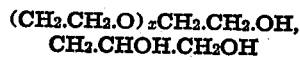

wherein R$_1$ and R$_2$ stand for H, CH$_3$ and (CH$_2$)$_x$CH$_3$ with an unbranched or a branched carbon chain
Z stands for instance for H, CH$_2$.CH$_2$.OH, (CH$_2$.CH$_2$.O)$_x$CH$_2$.CH$_2$.OH,
CH$_2$.CHOH.CH$_2$OH XCO stands for the radical of an aliphatic mono- or dicarboxylic acid with an unbranched or branched chain, containing OH, NH or another substituent
R stands for (CH$_2$)$_6$CH$_3$ to C$_{19}$H$_{39}$.CH$_3$ for instance for C$_{12}$H$_{25}$, and
R$_3$ stands for CH$_2$.CH$_2$.OH, (CH$_2$.CH$_2$.O)$_n$CH$_2$.CH$_2$.OH and CH$_2$.CH(OH).CH$_2$OH or similar groups.

Compounds corresponding with the above formulae are, for instance, the following: lauric-acid - hydroxyethylpolyethenoxydodecyl - amide, hydroxyethylpolyethenoxyamino-acetic-acid hexadecylamide, hydroxyethylpolyethenoxy-lactic-acid-dodecyl-amide, maleic-acid ethoxydodecyl-amide, the sodium salt of the maleic acid ester of lactic - acid - hydroxy - ethyldodecyl-amide, hydroxyethylpolyethenoxydodecyl urea, and condensation products of these compounds with ethylene oxide, glycide, etc., sodium dodecylaminodiacetate having the formula

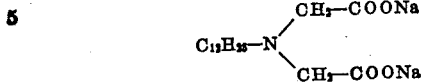

and compounds of the type of hydroxyethylpolyethenoxy-N-lauroylbutylglucamine, lauric-acid-diethanolamide, which are not comprised in the above general formulae. Furthermore there may be mentioned lactobionic acid octadecylamide, gluconic acid dodecylamide, and arabonic acid octadecylamide which partly may be used without having been converted into the hydroxyalkyl polyalkoxy compound by treatment with an alkylene oxide. Further compounds are mentioned below as the description proceeds.

In so far as such aliphatic amino compounds are insoluble in water, their salts must be used. For example hexyl-amine may advantageously be used in the form of its nitrate, hydrochloride or acetate. The free maleic acid ethoxy tetradecylamide is insoluble in water; its sodium salt is soluble. By adding to such amines radicles which increase their solubility in water, for example radicles containing hydroxyl, the plasticizing effect is increased. Thus for example the hydroxyalkyl polyalkoxy-dodecylamine produced by adding ethylene oxide to doddecylamine is an advantageous plasticizing agent for films of gelatin, methylcellulose, or the like. A similar effect is produced by the product obtained by a complex reaction between dodecylamine and ethylene imine. Another example of an effective water-soluble amino compound is polyhydroxyethyl-stearic-acid-amide, the addition product from stearic acid amide and ethylene oxide. Instead of ethylene oxide there may also be used another alkylene oxide, for instance, propylene oxide, butylene oxide, glycide, or monochlorhydrine or epichlorhydrine.

For many purposes, for example for softening photographic emulsions containing gelatin, it is necessary to use amines with the least possible basicity. In this case water-soluble amines with a long chain which contains an acid amide group are suitable. Amino-acids having a long chain, and their derivatives, for instance, diketopiperazine, which have been rendered soluble for example by causing them to react with ethylene oxide, may be used. Effective plasticizing agents which are not basic, are, for example, produced from decylamino-formic-(acetic- or propionic-) decylamide, and one to three times its weight of ethylene oxide.

Preferably long chain amines or their derivatives are not used singly, but mixed with a number of other amines. It has been found that such mixtures give a better effect than the single amines. Thus, for example, the mixture of amines containing essentially $C_8H_{17}NH_2$ to $C_{14}H_{29}NH_2$ which is obtained by substituting the hydroxyl groups by amino-groups to natural cocoa-alcohols is more suitable than for example pure dodecyl- or tetradecyl-amine. By treatment with ethylene oxide there is produced hydroxyalkyl polyalkoxy-cocoanut-fatty-amine-acetic-acid-cocoanut-amide ($C_7H_{14}NH_2$ to $C_{15}H_{30}NH_2$).

For producing transparent films it is necessary that the hydrophil organic colloid and the plasticizing agent be fully mixed both in solution and when free from the solvent. For opaque bodies, for example those containing pigments or fillers, this mutual solubility is unnecessary. Nevertheless even in this case a considerable increase of elasticity is the result of using long chain amines.

For many purposes it is desirable that the plasticizing agent shall not be extracted by agitation of the colloid with water. In such cases amino-bodies of high molecular weight which have been treated with ethylene oxide are specially suitable since although they are themselves soluble in water, they are not dissolved from the organic colloids merely by agitation with water.

The plastic masses are produced by dissolving the organophil colloid in water, if required, at a raised temperature, and mixing the solution with the softening agent. The softening agent is generally used in an amount of up to 50 per cent calculated on the hydrophil colloid.

The following examples serve to illustrate the invention:

*Example 1.*—A solution of gelatin in warm water is mixed with an addition of 10 per cent of hydroxyethylpolyethenoxy-palm-kernel-fatty-amine and is made into sheets of 20 to 30µ thickness. These sheets are suitable for wrapping purposes in tropical and northern countries having a low content of moisture in the atmosphere. Instead of the enumerated softener there may also be used hydroxyethylpolyethenoxy-cocoanut-fatty-amino-acetic acid cocoanut-amide.

*Example 2.*—A photographic emulsion for a photographic paper is mixed with 10 per cent of hydroxyethylpolyethenoxy-lactic-acid-cocoanut-fatty-amide. Films cast from this solution are very flexible. Instead of the enumerated softener there may also be used the sodium salt of the maleic-acid ester of the lactic-acid-hydroxyethyl-dodecylamide or the potassium salt of the hydroxyethylpolyethenoxy-tartaric acid octylamide.

*Example 3.*—A photographic emulsion for the manufacture of cinematographic films is mixed before casting, preferably together with the usual addition with 5 per cent of the product of reaction from glycide and lauric acid diethanolamide. Instead of the enumerated softener there may also be used lauric acid diethanolamide.

*Example 4.*—An aqueous solution of methylcellulose heated at 15° C. is mixed with 20 per cent of saccharic acid octodecylamide treated with monochlorhydrine and then with propylene oxide. The solution may be made into sheets and spraying masses. Instead of the saccharic acid softener there may also be used lactobionic acid decylamide or arabonic acid decylamide treated with monochlorhydrine.

*Example 5.*—To a solution of polyvinylalcohol there are added 5 per cent of hydroxyethylpolyethenoxy-N-lauroyl-butyl-glucamine having the formula

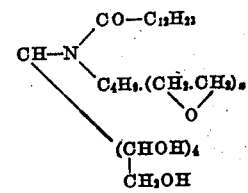

Formaldehyde is added to the solution for hardening purposes; then the solution may be made into tubes which are stable against benzine. Instead of the glucamine softening agent there may also be used gluconic acid hydroxyethyl palmkernel amide.

What I claim is:

1. A process of producing plastic masses from hydrophil organic colloids which comprises dissolving a hydrophil organic colloid selected from the group consisting of albuminous substances, cellulosic compounds, polysaccharides and polymerized vinyl compounds in water and mixing the solution thus obtained with an aliphatic amino compound having an unbranched carbon chain of at least six carbon atoms.

2. A process of producing plastic masses from hydrophil organic colloids which comprises dissolving a hydrophil organic colloid selected from the group consisting of albuminous substances, cellulosic compounds, polysaccharides and polymerized vinyl compounds in water and mixing the solution thus obtained with a salt of an aliphatic amino compound having an unbranched carbon chain of at least six carbon atoms.

3. A process of producing plastic masses from hydrophil organic colloids which comprises dissolving a hydrophil organic colloid selected from the group consisting of albuminous substances, cellulosic compounds, polysaccharides and polymerized vinyl compounds in water and mixing the solution thus obtained with an aliphatic amino compound having an unbranched carbon chain of at least six carbon atoms and having its solubility in water increased by the addition of a group containing hydroxyl.

4. A process of producing plastic masses from hydrophil organic colloids which comprises dissolving a hydrophil organic colloid selected from the group consisting of albuminous substances, cellulosic compounds, polysaccharides and polymerized vinyl compounds in water and mixing the solution thus obtained with a compound having an unbranched carbon chain of at least six carbon atoms selected from the group consisting of amines, amino acids, acid amides, and a product of reaction between amines, amino acids and acid amides with an alkylene oxide, and mixtures thereof.

5. A process of producing plastic masses from hydrophil organic colloids which comprises dissolving a hydrophil organic colloid selected from the group consisting of albuminous substances, cellulosic compounds, polysaccharides and polymerized vinyl compounds in water and mixing the solution thus obtained with hydroxy alkyl polyalkoxydodecylamine.

6. A process of producing plastic masses from hydrophil organic colloids which comprises dissolving a hydrophil organic colloid selected from the group consisting of albuminous substances, cellulosic compounds, polysaccharides and polymerized vinyl compounds in water and mixing the solution thus obtained with hydroxyalkyl polyalkoxy-lactic-acid-dodecylamide.

7. A process of producing plastic masses from hydrophil organic colloids which comprises dissolving a hydrophil organic colloid selected from the group consisting of albuminous substances, cellulosic compounds, polysaccharides and polymerized vinyl compounds in water and mixing the solution thus obtained with hydroxyalkyl polyalkoxy-cocoanut-fatty-amine-acetic-acid-cocoanut-amide.

8. A composition of matter comprising an aqueous solution of a hydrophil organic colloid selected from the group consisting of albuminous substances, cellulosic compounds, polysaccharides and polymerized vinyl compounds and an aliphatic amino compound having an unbranched carbon chain of at least six carbon atoms.

9. A composition of matter comprising an aqueous solution of a hydrophil organic colloid selected from the group consisting of albuminous substances, cellulosic compounds, polysaccharides and polymerized vinyl compounds and a salt of an aliphatic amino compound having an unbranched carbon chain of at least six carbon atoms.

10. A composition of matter comprising an aqueous solution of a hydrophil organic colloid selected from the group consisting of albuminous substances, cellulosic compounds, polysaccharides and polymerized vinyl compounds and an aliphatic amino compound having an unbranched carbon chain of at least six carbon atoms and having its solubility in water increased by the addition of a group containing hydroxyl.

11. A composition of matter comprising an aqueous solution of a hydrophil organic colloid selected from the group consisting of albuminous substances, cellulosic compounds, polysaccharides and polymerized vinyl compounds and a compound having an unbranched carbon chain of at least six carbon atoms selected from the group consisting of amines, amino acids, acid amides, and a product of reaction between amines, amino acids, and acid amides with an alkylene oxide, and mixtures thereof.

12. A composition of matter comprising an aqueous solution of a hydrophil organic colloid selected from the group consisting of albuminous substances, cellulosic compounds, polysaccharides and polymerized vinyl compounds and hydroxyalkyl polyalkoxydodecylamine.

13. A composition of matter comprising an aqueous solution of a hydrophil organic colloid selected from the group consisting of albuminous substances, cellulosic compounds, polysaccharides and polymerized vinyl compounds and hydroxyalkyl polyalkoxy-lactic-acid-dodecylamide.

14. A composition of matter comprising an aqueous solution of a hydrophil organic colloid selected from the group consisting of albuminous substances, cellulosic compounds, polysaccharides and polymerized vinyl compounds and hydroxyalkyl polyalkoxy-cocoanut-fatty-amine-acetic-acid-cocoanut-amide.

GUSTAV WILMANNS.